Dec. 1, 1936.  H. M. NOEL  2,062,374
METHOD FOR COOLING AND GRANULATING ASPHALT
Filed Aug. 18, 1934
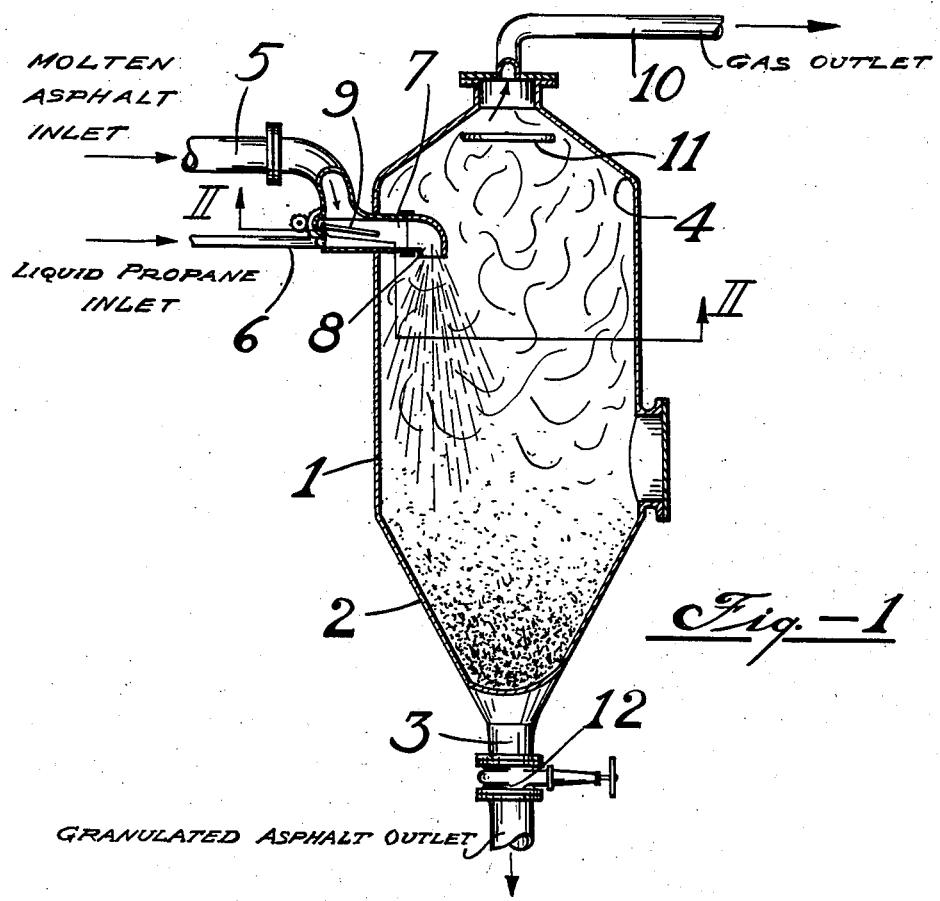
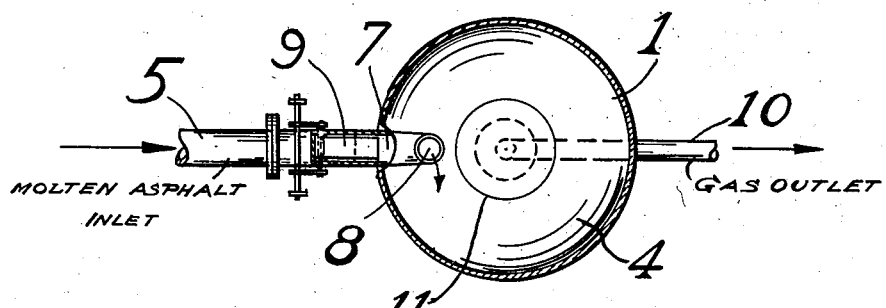
Henry M. Noel Inventor
By W. E. Currie Attorney Patented Dec. 1, 1936

2,062,374

UNITED STATES PATENT OFFICE 2,062,374

METHOD FOR COOLING AND GRANULATING ASPHALT

Henry M. Noel, Paris, France, assignor to Standard Oil Development Company, a corporation of Delaware Application August 18, 1934, Serial No. 740,419

5 Claims. (Cl. 83—91)

This invention relates to a process for cooling and granulating asphalt of the type that is solid at normal room temperatures but which is liquid at higher temperatures.

Asphalt is generally shipped in metallic barrels and on arrival at the destination the barrels are cut open and the asphalt removed by chopping out pieces and then melting down or granulating mechanically before use. It is desirable to have asphalt in granulated form so that it may be easily removed from the barrel without necessitating the destruction of the barrel itself or subsequent granulation.

An object of this invention is to provide a method and apparatus for granulating asphalt so that it may be very easily handled both by the producer and the consumer.

The invention will be best understood by reference to the accompanying drawing in which Fig. 1 somewhat diagrammatically illustrates a suitable apparatus partly in side elevation and partly in cross section for practicing the invention, and Fig. 2 illustrates a detailed transverse sectional view taken on line II—II of Fig. 1.

Referring to the drawing, numeral 1 is a drum with a conical bottom 2 and conical top 4. Conical bottom 2 is extended to form a neck 3. A tube 5 is provided for passing molten asphalt into the drum 1. A tube 6 is provided for passing liquid propane into drum 1. Tubes 5 and 6 are connected to form resulting tube 7 which is provided with a spray nozzle 8 to pass the mixture of asphalt and propane from tube 7 into drum 1. A movable baffle 9 is provided at the junction of tubes 5 and 6 and used as a means to regulate the amount of asphalt that is passed into drum 1. Tube 10 is provided to remove gases from the drum 1 with a baffle arrangement 11 in drum 1. A gate valve 12 is provided in neck 3 to discharge the granulated asphalt from drum 1.

In the process for the cooling and granulation of asphalt, liquid asphalt, which has been heated to a temperature of about 100° C. or more above the softening point, is passed into tube 5 and liquid propane into tube 6. The liquid propane and asphalt are passed and contacted into tube 7 and emptied through the spray nozzle 8 into drum 1. The liquid propane, in passing into drum 1, is gasified and cools the asphalt with which it is in contact. Thereby the asphalt is solidified and in the form of granular particles is deposited in the bottom of drum 1 or it may be removed into suitable receivers, as desired, by means of gate valve 12. The propane gas is then removed by means of outlet 10 and may be recompressed and cooled over again or passed into the fuel line. The quantities of asphalt and propane passed into the drum are adjusted by means of baffle 9 in order that the asphalt is sufficiently cooled so that it will granulate and become brittle issuing from tube 7 into drum 1, where it is easily removable from the lower cone 2 and discharged onto railroad cars. The temperature at which the asphalt is passed into the tube 5 is about 260° C. for asphalts having a softening point above 120° C. and about 205° C. for asphalts having a softening point below 120° C.

It is preferred that two drums should be provided so that one may be filled with granulated asphalt while the other is being blown with gas and emptied. Other gases may be used especially those that are liquefied at a temperature below 0° C., particularly at —10° to —50° C.

The foregoing description is merely illustrative and various changes and alternative arrangements may be made within the scope of the appended claims in which it is my intention to claim all inherent novelty as broadly as the prior art permits.

I claim:

1. The process for manufacturing granulated particles of asphalt, which comprises mixing and passing molten asphalt and a liquid hydrocarbon which has a boiling point below 0° C. into the upper portion of an enlarged container, regulating the amount of asphalt and the liquid hydrocarbon passed into the enlarged container so that the asphalt is cooled sufficiently to be completely solidified into small brittle particles and the liquid hydrocarbon gasified, and separately removing the granulated small particles of asphalt and hydrocarbon gas.

2. A process for manufacturing granulated particles of asphalt, which comprises mixing and passing molten asphalt and liquid propane into the upper portion of an enlarged container, regulating the amount of asphalt and liquid propane passed into the enlarged container so that the asphalt is cooled sufficiently to be completely solidified into small brittle particles and the liquid propane gasified, and separately removing the granulated small particles of asphalt and propane gas.

3. A process for manufacturing granulated fine particles of asphalt, which comprises heating an asphalt to a temperature of about 100° C. above the softening point, mixing the molten asphalt with liquid propane, passing the mixture of asphalt and propane into the upper portion of an enlarged container, regulating the amount of asphalt and liquid propane passed into the enlarged container so that the asphalt is cooled sufficiently to be completely solidified into small brittle particles and the liquid propane gasified, and separately removing the granulated small particles of asphalt and propane gas.

4. A process for manufacturing fine particles of asphalt, which comprises heating asphalt to a temperature of about 260° C., mixing the molten asphalt with liquid propane, passing the mixture of asphalt and liquid propane into the upper portion of an enlarged container, regulating the amount of asphalt and liquid propane passed into the enlarged container so that the asphalt is cooled sufficiently to be completely solidified into small brittle particles and the liquid propane gasified, and separately removing the granulated small particles of asphalt and propane gas.

5. A process for manufacturing fine particles of asphalt, which comprises heating asphalt to a temperature of about 205° C., mixing the molten asphalt with liquid propane, passing the mixture of asphalt and liquid propane into the upper portion of an enlarged container, regulating the amount of asphalt and liquid propane passed into the enlarged container so that the asphalt is cooled sufficiently to be completely solidified into small brittle particles and the liquid propane gasified, and separately removing the granulated small particles of asphalt and propane gas.

HENRY M. NOEL.